(12) United States Patent
Bhattad et al.

(10) Patent No.: US 12,119,994 B2
(45) Date of Patent: Oct. 15, 2024

(54) OFFSET AND DYNAMIC FEEDBACK INFORMATION VALIDATION FOR CONFIGURED GRANTS

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 16/948,603

(22) Filed: Sep. 24, 2020

(65) Prior Publication Data

US 2021/0099348 A1 Apr. 1, 2021

(30) Foreign Application Priority Data

Sep. 27, 2019 (IN) .............................. 201941039139

(51) Int. Cl.
*H04L 41/0869* (2022.01)
*H04B 7/06* (2006.01)
(Continued)

(52) U.S. Cl.
CPC ....... *H04L 41/0869* (2013.01); *H04B 7/0621* (2013.01); *H04L 1/08* (2013.01);
(Continued)

(58) Field of Classification Search
CPC ..... H04L 41/0869; H04L 1/08; H04L 1/1816; H04L 5/0055; H04B 7/0621
See application file for complete search history.

(56) References Cited

U.S. PATENT DOCUMENTS

2016/0344517 A1 11/2016 Bergstrom et al.
2021/0298075 A1* 9/2021 Talarico ................. H04W 72/23
(Continued)

OTHER PUBLICATIONS

Huawei, et al., "Reliability Enhancement for Grant-Free Transmission", 3GPP TSG WG1 Meeting #92, 3GPP Draft, R1-1801787, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397761, 6 Pages, Retrieved from the Internet: URL: http://www.3gpp.org/ftp/tsg%5Fran/WG1%5FRL1/TSGR1%5F92/Docs/ [retrieved on Feb. 17, 2018], Section 4, p. 3, Lines 8-18, paragraph [0002]-paragraph [0006].

(Continued)

*Primary Examiner* — Huy D Vu
*Assistant Examiner* — Robert Ma
(74) *Attorney, Agent, or Firm* — Harrity & Harrity, LLP

(57) ABSTRACT

Various aspects of the present disclosure generally relate to wireless communication. In some aspects, a user equipment (UE) may transmit a plurality of slot-aggregated physical uplink shared channel (PUSCH) transmissions associated with a common transport block; receive a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK); determine whether one or more PUSCH transmissions, of the plurality of slot-aggregated PUSCH transmissions, satisfy a delay condition associated with receipt of the DFI transmission; and determine whether the HARQ feedback is valid based at least in part on whether the one or more PUSCH transmissions satisfy the delay condition. Numerous other aspects are provided.

24 Claims, 9 Drawing Sheets

(51) Int. Cl.
| | |
|---|---|
| H04L 1/08 | (2006.01) |
| H04L 1/1812 | (2023.01) |
| H04L 5/00 | (2006.01) |
| H04L 41/0803 | (2022.01) |
| H04W 72/0446 | (2023.01) |
| H04W 74/04 | (2009.01) |

(52) U.S. Cl.
CPC .......... *H04L 1/1816* (2013.01); *H04L 5/0055* (2013.01); *H04L 41/0803* (2013.01); *H04W 72/0446* (2013.01); *H04W 74/04* (2013.01)

(56) References Cited

U.S. PATENT DOCUMENTS

2022/0014314 A1* 1/2022 Wang .................. H04L 1/08
2022/0216954 A1* 7/2022 Lin ..................... H04L 1/1851

OTHER PUBLICATIONS

International Search Report and Written Opinion—PCT/US2020/070585—ISA/EPO—Feb. 17, 2021.

Partial International Search Report—PCT/US2020/070585—ISA/EPO—Dec. 18, 2020.

Qualcomm Incorporated: "Enhancement to Configured Grants in NR Unlicensed", 3GPP TSG RAN WG1 Meeting #98, 3GPP Draft, R1-1909248, 7.2.2.2.4 Enhancement to Configured Grants for NR-U, 3rd Generation Partnership Project (3GPP), Mobile Competence Centre, 650, Route Des Lucioles, F-06921 Sophia-Antipolis Ce, vol. RAN WG1. No. Prague, CZ, Aug. 26, 2019-Aug. 30, 2019, Aug. 17, 2019 (Aug. 17, 2019), XP051765853, 12 Pages, Retrieved from the Internet: URL: http://www.3gpp.org/ftp/tsg_ran/WG1_RL1/TSGR1_98/Docs/R1-1909248.zip. [retrieved on Aug. 17, 2019] paragraph [0002]-paragraph [03. 5].

Vivo: "Feature Lead Summary on Configured Grant Enhancement", 3GPP Draft, 3GPP TSG RAN WG1#98, R1-1909476, 3rd Generation Partnership Project (3GPP), Mobile Competence Centre, 650, Route Des Lucioles, F-06921 Sophia-Antipolis Cedex, France, vol. RAN WG1. No. Prague, CZ, Aug. 26, 2019-Aug. 30, 2019, Sep. 3, 2019 (Sep. 3, 2019), XP051766078, 14 Pages, Retrieved from the Internet: URL: http://www.3gpp.org/ftp/tsg_ran/WG1_RL1/TSGR1_98/Docs/R1-1909476.zip. [retrieved on Sep. 3, 2019] paragraph [0002]-paragraph [0004],p. 3.

* cited by examiner

OFFSET AND DYNAMIC FEEDBACK INFORMATION VALIDATION FOR CONFIGURED GRANTS

CROSS-REFERENCE TO RELATED APPLICATION

This patent application claims priority to India Patent Application No. 201941039139, filed on Sep. 27, 2019, entitled "OFFSET AND DYNAMIC FEEDBACK INFORMATION VALIDATION FOR CONFIGURED GRANTS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for offset and dynamic feedback information validation for configured grants.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a plurality of slot-aggregated physical uplink shared channel (PUSCH) transmissions associated with a common transport block; receiving a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK); determining whether one or more PUSCH transmissions, of the plurality of slot-aggregated PUSCH transmissions, satisfy a delay condition associated with receipt of the DFI transmission; and determining whether the HARQ feedback is valid based at least in part on whether the one or more PUSCH transmissions satisfy the delay condition.

In some aspects, a method of wireless communication, performed by a base station, may include determining Type-A resource allocations for a plurality of UEs; and transmitting, to the plurality of UEs, offset configuration signaling to identify a plurality of different offsets for PUSCH transmission by the plurality of UEs.

In some aspects, a UE for wireless communication may include memory and one or more processors operatively coupled to the memory. The memory and the one or more processors may be configured to transmit a plurality of slot-aggregated PUSCH transmissions associated with a common transport block; receive a DFI transmission that includes HARQ feedback associated with the plurality of slot-aggregated PUSCH transmissions, wherein the HARQ feedback is a HARQ ACK or a HARQ NACK; determine whether one or more PUSCH transmissions, of the plurality of slot-aggregated PUSCH transmissions, satisfy a delay condition associated with receipt of the DFI transmission; and determine whether the HARQ feedback is valid based at least in part on whether the one or more PUSCH transmissions satisfy the delay condition.

In some aspects, a BS for wireless communication may include memory and one or more processors operatively coupled to the memory. The memory and the one or more processors may be configured to determine Type-A resource allocations for a plurality of UEs; and transmit, to the plurality of UEs, offset configuration signaling to identify a plurality of different offsets for PUSCH transmission by the plurality of UEs.

In some aspects, a non-transitory computer-readable medium may store one or more instructions for wireless communication. The one or more instructions, when executed by one or more processors of a UE, may cause the one or more processors to: transmit a plurality of slot-aggregated PUSCH transmissions associated with a common transport block; receive a DFI transmission that includes HARQ feedback associated with the plurality of slot-aggregated PUSCH transmissions, wherein the HARQ feedback is a HARQ ACK or a HARQ NACK; determine whether one or more PUSCH transmissions, of the plurality of slot-aggregated PUSCH transmissions, satisfy a delay condition associated with receipt of the DFI transmission; and determine whether the HARQ feedback is valid based at least in part on whether the one or more PUSCH transmissions satisfy the delay condition.

In some aspects, a non-transitory computer-readable medium may store one or more instructions for wireless communication. The one or more instructions, when executed by one or more processors of a BS, may cause the one or more processors to: determine Type-A resource allocations for a plurality of UEs; and transmit, to the plurality of UEs, offset configuration signaling to identify a plurality of different offsets for PUSCH transmission by the plurality of UEs.

In some aspects, an apparatus for wireless communication may include means for transmitting a plurality of slot-aggregated PUSCH transmissions associated with a common transport block; means for receiving a DFI transmission that includes HARQ feedback associated with the plurality of slot-aggregated PUSCH transmissions, wherein the HARQ feedback is a HARQ ACK or a HARQ NACK; means for determining whether one or more PUSCH transmissions, of the plurality of slot-aggregated PUSCH transmissions, satisfy a delay condition associated with receipt of the DFI transmission; and means for determining whether the HARQ feedback is valid based at least in part on whether the one or more PUSCH transmissions satisfy the delay condition.

In some aspects, an apparatus for wireless communication may include means for determining Type-A resource allocations for a plurality of UEs; and means for transmitting, to the plurality of UEs, offset configuration signaling to identify a plurality of different offsets for PUSCH transmission by the plurality of UEs.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
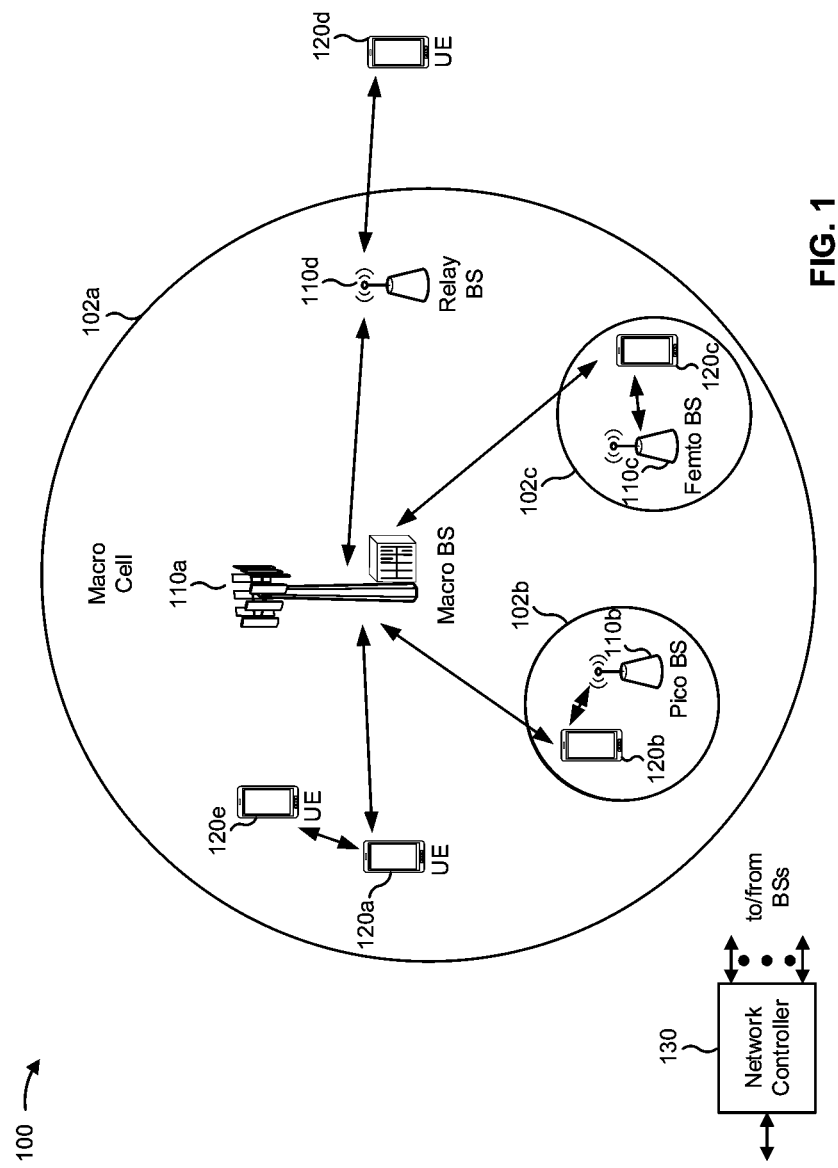
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
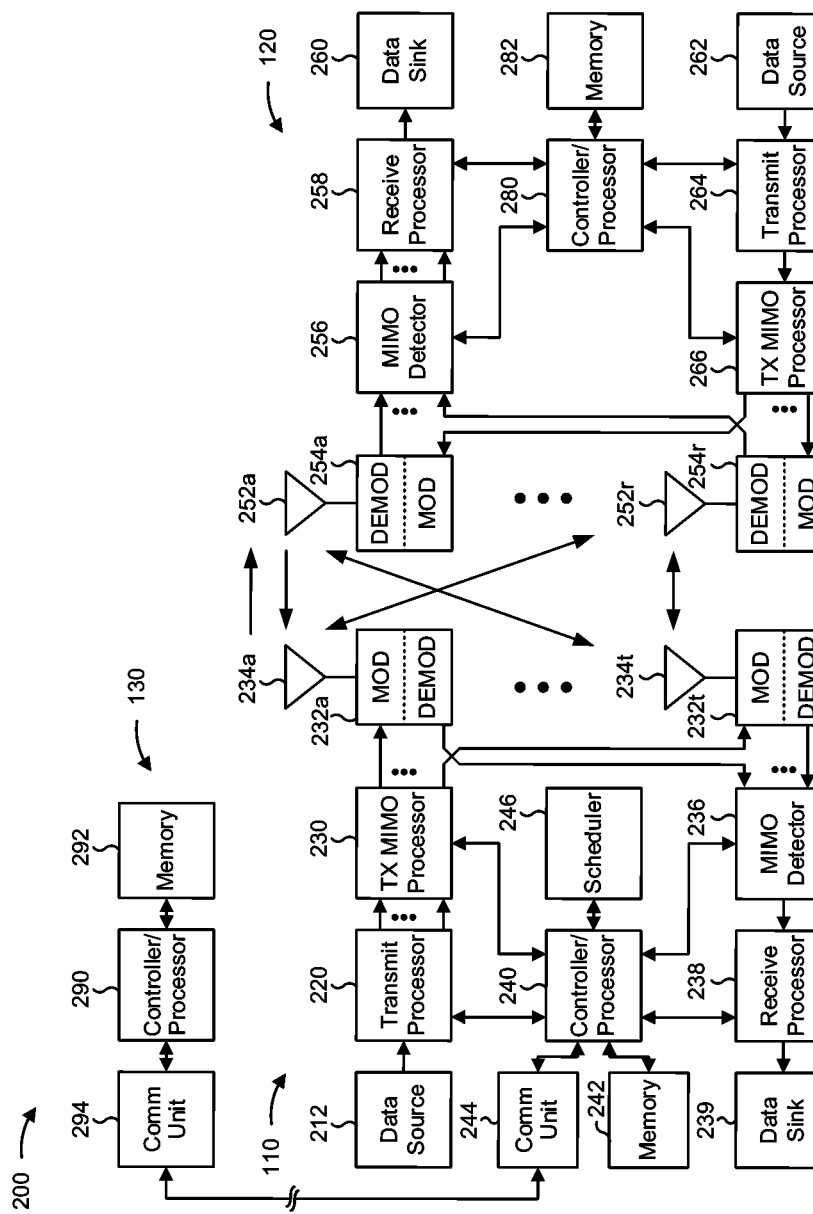
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with offset and dynamic feedback information validation for configured grants, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7 and/or other processes as described herein. A scheduler 246 may schedule UEs for data transmission on the downlink and/or uplink.

In some aspects, UE 120 may include means for transmitting a plurality of slot-aggregated physical uplink shared channel (PUSCH) transmissions associated with a common transport block, means for receiving a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK), means for determining whether one or more PUSCH transmissions, of the plurality of slot-aggregated PUSCH transmissions, satisfy a delay condition associated with receipt of the DFI transmission, means for determining whether the HARQ feedback is valid based at least in part on whether the one or more PUSCH transmissions satisfy the delay condition, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining Type-A resource allocations for a plurality of UEs, means for transmitting, to the plurality of UEs, offset configuration signaling to identify a plurality of different offsets for PUSCH transmission by the plurality of UEs, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some communications systems, such as NR, a BS may provide a configured grant to identify a set of uplink resources, which occur periodically, to a UE.

Each configured grant may be associated with a HARQ process to enable HARQ feedback reporting regarding a success of an uplink transmission on an uplink resource identified by a configured grant. The HARQ process enables retransmission to increase a reliability of communications in a network.

A UE may transmit an uplink transmission and may set a HARQ retransmission timer. If, after expiration of the HARQ retransmission timer, the UE has not received HARQ feedback, the UE may retransmit the uplink transmission. During a period of time associated with the HARQ retransmission timer, the UE may receive a dynamic feedback indicator (DFI) that may convey a HARQ acknowledgement (ACK) or HARQ negative acknowledgement (NACK). For example, when the UE receives a HARQ NACK from the BS before expiration of the HARQ retransmission timer, the UE may stop the HARQ retransmission timer and may retransmit the uplink transmission. In contrast, on receipt of a HARQ ACK, the UE may flush a HARQ buffer and discard a transport block associated with the HARQ ACK.

However, when a BS transmits a DFI, the DFI may not indicate to which transport block the HARQ feedback is applicable. As a result, the UE may apply HARQ feedback, that is intended for a first transport block, to a second transport block occurring after the first transport block. To avoid misapplying the HARQ feedback, a UE may determine DFI validity (e.g., whether a DFI is to be applied to a transport block associated with a PUSCH retransmission). For example, a UE may determine that HARQ feedback is valid for a PUSCH transmission that ends greater than a threshold duration (e.g., which may be configured using radio resource signaling) before receipt of the HARQ feedback in a DFI. However, in slot aggregation scenarios, a plurality of PUSCH transmissions may correspond to the same transport block.

An additional issue arises for configured grants with respect to offsets. For example, a UE may perform a listen-before-talk (LBT) procedure before initiating uplink transmission. A plurality of UEs may be assigned a common set of configured grant PUSCH resources to improve radio resource utilization efficiency, relative to each UE having dedicated configured grant PUSCH resources. To avoid transmission collisions, the BS may cause different UEs with a common configured grant PUSCH resource to use different PUSCH start offsets. For example, the BS may cause a first UE to start a PUSCH at a first time and a second UE to start a PUSCH at a second time that is after the first time. In this case, if the first UE initiates uplink transmission, then the second UE will forgo performing uplink transmission (e.g., based at least in part on a listen-before-talk failure). In contrast, if the first UE does not initiate uplink transmission at the first time, the second UE will proceed with performing uplink transmission (e.g., in connection with a listen-before-talk success). A BS may perform resource allocations for configured grant PUSCH transmissions on a full slot basis (e.g., Type-A resource allocation) or on a sub-slot basis (e.g., Type-B resource allocation). However, sub-slot resource allocation may result in a UE puncturing a demodulation reference signal (DMRS) as a result of a shifted transmission time in connection with an offset.

Some aspects described herein enable offset and DFI validation for configured grants. For example, a UE may determine whether HARQ feedback is valid based at least in part on whether one or more PUSCH transmissions (e.g., a sequentially last PUSCH transmission of a plurality of PUSCH transmissions, any PUSCH transmission of a plurality of PUSCH transmissions, and/or the like) satisfy a delay condition. In this case, the UE may selectively apply HARQ feedback to cause a PUSCH retransmission based at least in part on whether the HARQ feedback is valid. In this way, the UE avoids applying HARQ feedback to a PUSCH transmission for which a transport block is already flushed, thereby improving network performance. Additionally, or alternatively, the BS may transmit a resource allocations to a plurality of UEs and, if the resource allocations are Type-A resource allocations, cause the plurality of UEs to use a plurality of offsets for transmitting using the resource allocations. In contrast, if the resource allocations are Type-B resource allocations, the BS may cause the plurality of UEs to use a single start time for transmitting using the resource allocations. In this way, the BS avoids puncturing of a DMRS, thereby improving network performance.

Figure 3:
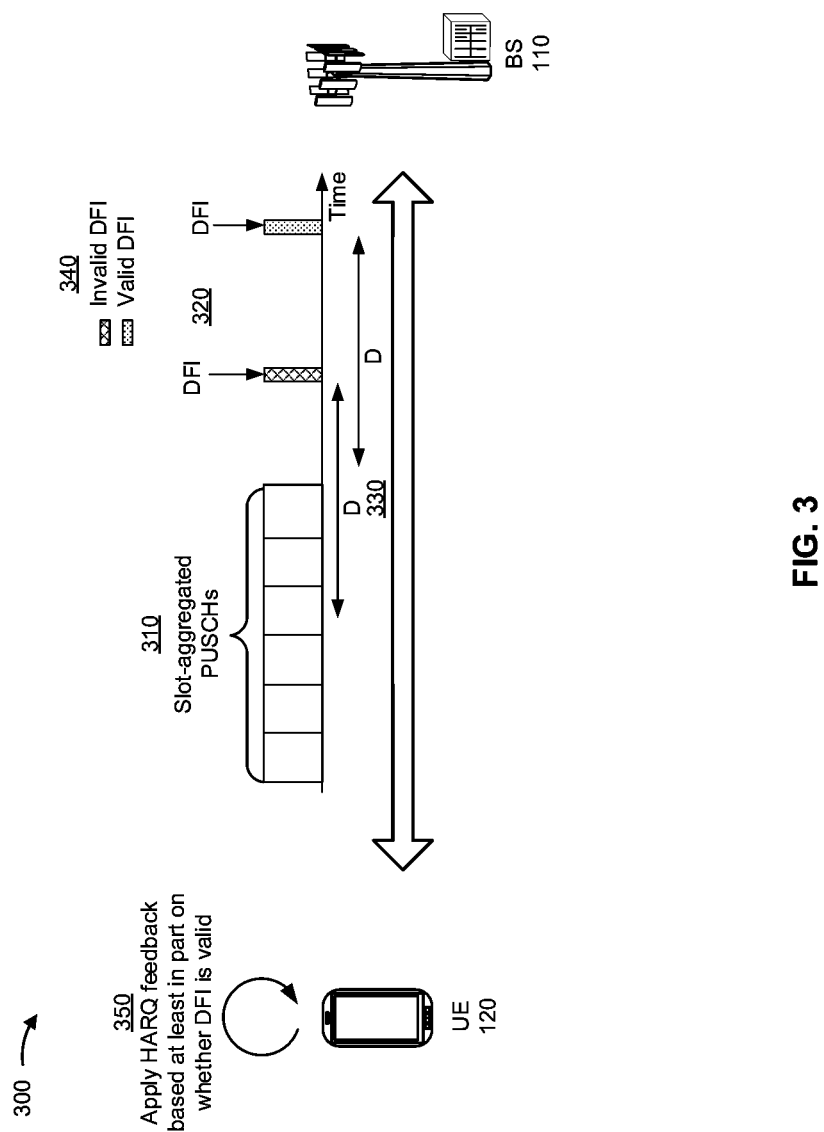
FIG. 3 is a diagram illustrating an example of DFI validation for configured grants, in accordance with various aspects of the present disclosure.

FIG. 3 is a diagram illustrating an example 300 of DFI validation for configured grants, in accordance with various aspects of the present disclosure. As shown in FIG. 3, example 300 includes a BS 110 and a UE 120.

As further shown in FIG. 3, and by reference number 310, UE 120 may transmit a plurality of slot-aggregated PUSCHs. For example, UE 120 may transmit the plurality of slot-aggregated PUSCHs to BS 110 using configured grant PUSCH resources. In some aspects, the slot-aggregated PUSCHs may be repetitions of a PUSCH communication. For example, UE 120 may transmit a plurality of repetitions of a PUSCH communication. In some aspects, UE 120 may transmit using the configured grant PUSCH resources based at least in part on receiving an indication of the configured grant PUSCH resources. For example, UE 120 may receive a configured grant from BS 110 that identifies periodic PUSCH resources for UE 120 to use for uplink transmission.

As further shown in FIG. 3, and by reference number 320, UE 120 may receive a DFI as a response to transmitting the plurality of slot aggregated PUSCHs. For example, UE 120 may receive a first DFI at a first time and a second DFI at a second time. In some aspects, UE 120 may receive a DFI including a particular type of feedback information. For example, UE 120 may receive a DFI including HARQ ACK feedback, HARQ NACK feedback, and/or the like.

As further shown in FIG. 3, and by reference number 330, UE 120 may determine whether one or more PUSCH transmissions, of the plurality of slot-aggregated PUSCH transmissions, satisfy a delay condition associated with receipt of a DFI transmission. For example, UE 120 may determine whether one or more PUSCH transmissions satisfy the delay condition for the first DFI or the second DFI. In some aspects, UE 120 may determine whether a particular PUSCH transmission, of the plurality of slot-aggregated PUSCH transmissions, satisfies the delay condition. For example, UE 120 may determine whether a sequentially last PUSCH, of the plurality of slot-aggregated PUSCH transmissions, was transmitted greater than a threshold time duration, D, before a DFI. In this case, as shown, the last PUSCH is not transmitted greater than the threshold time duration before the first DFI, but is transmitted greater than the threshold time duration before the second DFI. Other delay conditions are possible, as described herein in more detail with regard to FIG. 4.

As further shown in FIG. 3, and by reference number 340, UE 120 may determine whether HARQ feedback included in a DFI is valid based at least in part on whether one or more PUSCH transmissions satisfy the delay condition for the first DFI or the second DFI. For example, UE 120 may determine that HARQ feedback associated with the first DFI is invalid based at least in part on determining that the last PUSCH of the plurality of PUSCHs was not transmitted greater than the duration, D, earlier than the first DFI. In contrast, UE 120 may determine that HARQ feedback associated with the second DFI is valid based at least in part on determining that the last PUSCH of the plurality of PUSCHs is transmitted greater than the duration, D, earlier than the second DFI. For example, UE 120 may determine that the HARQ feedback is valid when a first symbol of a PDCCH reception is before a last symbol of a PUSCH transmission or repetition thereof by a threshold quantity of symbols.

As further shown in FIG. 3, and by reference number 350, UE 120 may apply HARQ feedback based at least in part on whether a DFI that includes the HARQ feedback is valid. For example, UE 120 may forgo applying HARQ feedback of the first DFI, but may apply HARQ feedback of the second DFI. In this way, UE 120 uses the delay condition to avoid applying HARQ feedback to a PUSCH transmission for which a transport block is flushed.

As indicated above, FIG. 3 is provided as an example. Other examples may differ from what is described with respect to FIG. 3.

Figure 4:
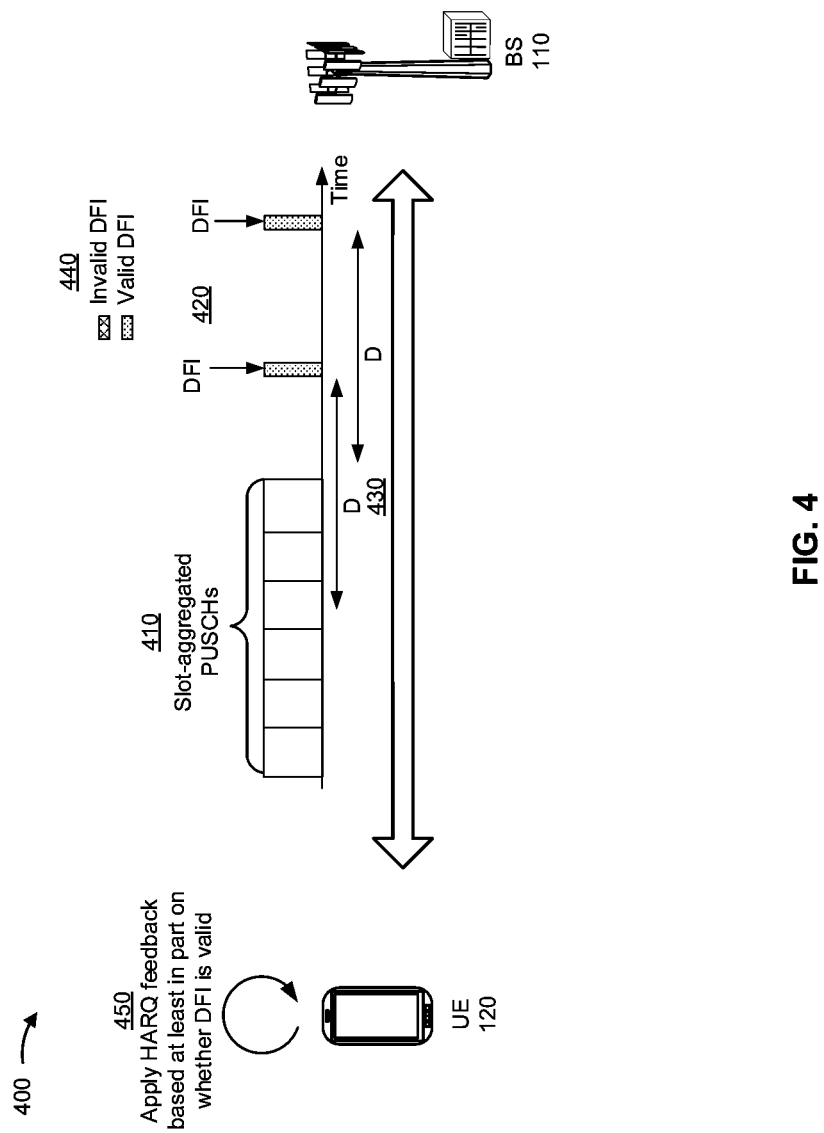
FIG. 4 is a diagram illustrating an example of DFI validation for configured grants, in accordance with various aspects of the present disclosure.

FIG. 4 is a diagram illustrating an example 400 of DFI validation for configured grants, in accordance with various aspects of the present disclosure. As shown in FIG. 4, example 400 includes a BS 110 and a UE 120.

As further shown in FIG. 4, and by reference number 410, UE 120 may transmit a plurality of slot-aggregated PUSCHs. For example, UE 120 may transmit the plurality of slot-aggregated PUSCHs to BS 110 using configured grant PUSCH resources. In some aspects, UE 120 may transmit using the configured grant PUSCH resources based at least in part on receiving an indication of the configured grant PUSCH resources. For example, UE 120 may receive a configured grant from BS 110 that identifies periodic PUSCH resources for UE 120 to use for uplink transmission.

As further shown in FIG. 4, and by reference number 420, UE 120 may receive a DFI as a response to transmitting the plurality of slot aggregated PUSCHs. For example, UE 120 may receive a first DFI at a first time and a second DFI at a second time. In some aspects, UE 120 may receive a DFI including a particular type of feedback information. For example, UE 120 may receive a DFI including HARQ ACK feedback, HARQ NACK feedback, and/or the like.

As further shown in FIG. 4, and by reference number 430, UE 120 may determine whether one or more PUSCH transmissions, of the plurality of slot-aggregated PUSCH transmissions, satisfy a delay condition associated with receipt of a DFI transmission. For example, UE 120 may determine whether one or more PUSCH transmissions satisfy the delay condition for the first DFI or the second DFI. In some aspects, UE 120 may determine whether any PUSCH transmission, of the plurality of slot-aggregated PUSCH transmissions, satisfies the delay condition. For example, UE 120 may determine whether any PUSCH, of the plurality of slot-aggregated PUSCH transmissions, was transmitted greater than a threshold time duration, D, before a DFI. In this case, as shown, the at least one PUSCH is transmitted greater than the threshold time duration before both the first DFI and the second DFI.

In some aspects, UE 120 may determine the delay condition based at least in part on received radio resource control (RRC signaling from BS 110. For example, BS 110 may transmit RRC signaling to indicate whether to determine the delay condition in connection with a sequentially last PUSCH, as was described with regard to FIG. 3, or in connection with any PUSCH, as is described with regard to FIG. 4.

In some aspects, UE 120 may determine which PUSCHs satisfy the delay condition. For example, UE 120 may determine that a sequentially first three PUSCHs of the plurality of slot-aggregated PUSCHs satisfy the delay condition (e.g., the sequentially last three PUSCHs do not satisfy the delay condition of occurring greater than the threshold time duration before the first DFI). In contrast, UE 120 may determine that second HARQ feedback of the second DFI is valid for all PUSCHs of the plurality of slot-aggregated PUSCHs. In this case, as described herein, UE 120 may determine whether HARQ feedback is valid based at least in part on whether the subset of PUSCHs that satisfy the delay condition enable BS 110 to decode a transport block that includes the plurality of slot-aggregated PUSCHs.

As further shown in FIG. 4, and by reference number 440, UE 120 may determine whether HARQ feedback included in a DFI is valid based at least in part on whether one or more PUSCH transmissions satisfy the delay condition for the first DFI or the second DFI. For example, UE 120 may determine that HARQ feedback associated with the first DFI and the second DFI is valid based at least in part on determining that the at least one PUSCH of the plurality of PUSCHs is transmitted greater than the duration, D, earlier than the first DFI and the second DFI. In some aspects, UE 120 may determine that HARQ feedback is valid based at least in part on a content of a subset of PUSCHs that satisfy the delay condition. For example, UE 120 may determine that the HARQ feedback of the first DFI is valid when contents of the first three PUSCHs enable BS 110 to successfully decode a transport block that includes the plurality of slot-aggregated PUSCHs. In contrast, when contents of the first three PUSCHs do not enable BS 110 to successfully decode the transport block, UE 120 may determine that HARQ feedback of the first DFI is invalid.

As further shown in FIG. 4, and by reference number 450, UE 120 may apply HARQ feedback based at least in part on whether a DFI that includes the HARQ feedback is valid. For example, UE 120 may apply HARQ feedback of the first DFI and HARQ feedback of the second DFI. In some aspects, UE 120 may perform a HARQ retransmission based at least in part on receiving the HARQ feedback. For example, when UE 120 receives a NACK via a valid HARQ feedback, UE 120 may perform a HARQ retransmission to retransmit the plurality of slot-aggregated PUSCHs.

In some aspects, UE 120 may perform the HARQ retransmission based at least in part on receiving a HARQ NACK and when the HARQ NACK is only applicable to a subset of PUSCHs (e.g., a subset of PUSCHs that satisfy the delay condition for the DFI that includes the HARQ feedback), as described above. In this case, UE 120 may not stop a retransmission timer when UE 120 receives a HARQ NACK applicable to a subset of PUSCHs. In contrast, UE 120 may perform HARQ retransmission based at least in part on receiving a HARQ NACK and when the HARQ NACK is applicable to the sequentially last PUSCH (e.g., the sequentially last PUSCH satisfies the delay condition for the DFI including the HARQ feedback). In this case, UE 120 may stop the retransmission timer based at least in part on receiving the HARQ NACK. Further to this example, UE 120 may apply a HARQ ACK even when the HARQ ACK only applies to a subset of PUSCHs.

As indicated above, FIG. 4 is provided as an example. Other examples may differ from what is described with respect to FIG. 4.

Figure 5:
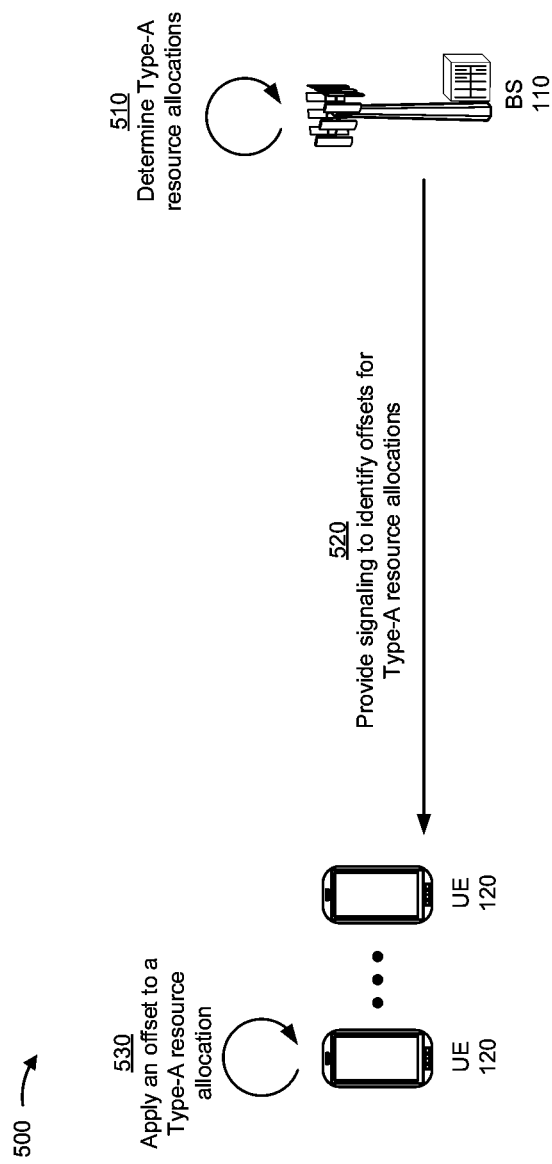
FIG. 5 is a diagram illustrating an example of offset validation for configured grants, in accordance with various aspects of the present disclosure.

FIG. 5 is a diagram illustrating an example 500 of DFI validation for configured grants, in accordance with various aspects of the present disclosure. As shown in FIG. 5, example 500 includes a BS 110 and a plurality of UEs 120.

As further shown in FIG. 5, and by reference number 510, BS 110 may determine Type-A resource allocations for the plurality of UEs 120. For example, BS 110 may determine resource allocations for configured grant PUSCH transmissions. In this case, the Type-A resource allocations may be associated with a plurality of different offsets for the plurality of UEs 120.

As further shown in FIG. 5, and by reference number 520, BS 110 may provide offset configuration signaling to identify the offsets for the Type-A resource allocations. For example, BS 110 may transmit first signaling to a first UE 120 to indicate a first offset for PUSCH transmission by the first UE 120, and may transmit second signaling to a second UE 120 to indicate a second offset for PUSCH transmission by the second UE 120. Additionally, or alternatively, BS 110 may transmit resource allocation identification signaling to identify the Type-A resource allocations for the plurality of UEs 120.

In some aspects, BS 110 may transmit RRC signaling to indicate that the plurality of different offsets are only applicable to Type-A resource allocations and not to Type-B resource allocations. Additionally, or alternatively, BS 110 may transmit the offset configuration signaling identifying the offsets, and the plurality of UEs 120 may determine that the offsets apply to Type-A resource allocations and not to Type-B resource allocations. In this case, the plurality of UEs 120 may determine that the offsets apply to Type-A resource allocations and not to Type-B resource allocations based at least in part on, for example, a stored configuration. In some aspects, based at least in part on determining that the resource allocations are Type-A resource allocations and that the offsets apply to Type-A resource allocations, UE 120 may apply the offsets to Type-A resource allocations, as shown by reference number 530, and may transmit using the Type-A resource allocations in accordance with the offsets.

As indicated above, FIG. 5 is provided as an example. Other examples may differ from what is described with respect to FIG. 5.

Figure 6:
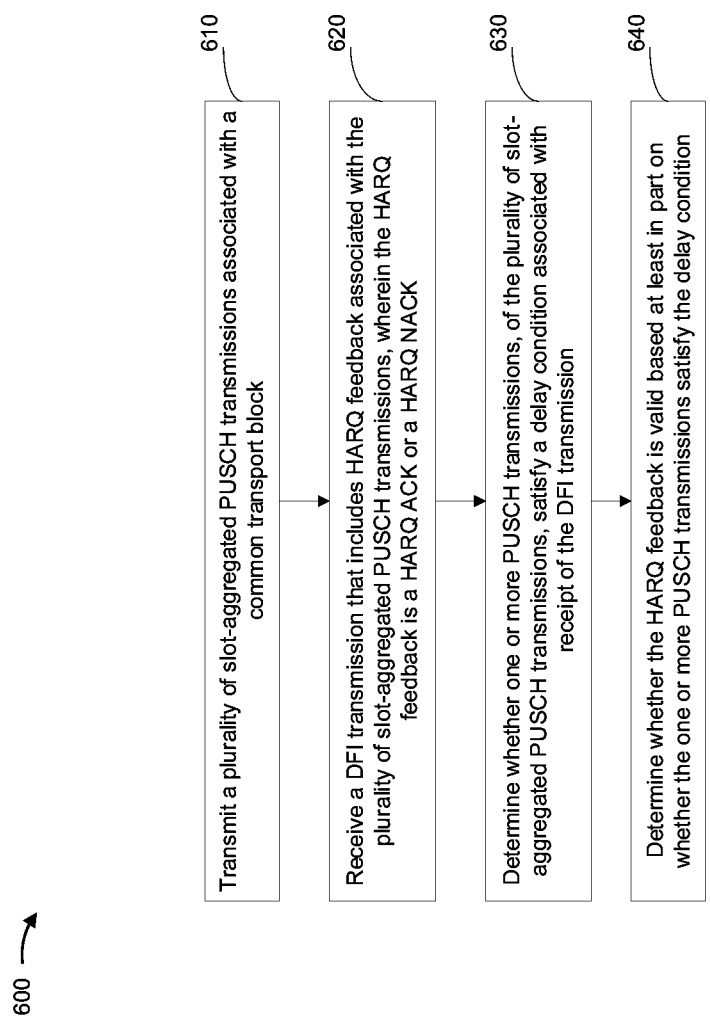
FIG. 6 is a diagram illustrating an example process performed, for example, by a user equipment, in accordance with various aspects of the present disclosure.

FIG. 6 is a diagram illustrating an example process 600 performed, for example, by a BS, in accordance with various aspects of the present disclosure. Example process 600 is an example where the UE (e.g., UE 120 and/or the like) performs operations associated with DFI validation for configured grants.

As shown in FIG. 6, in some aspects, process 600 may include transmitting a plurality of slot-aggregated PUSCH transmissions associated with a common transport block (block 610). For example, the UE (e.g., using controller/processor 280, transmit processor 264, TX MIMO processor 266, MOD 254, antenna 252, and/or the like) may transmit a plurality of slot-aggregated PUSCH transmissions associated with a common transport block, as described above. In some aspects, the plurality of slot-aggregated PUSCH transmissions may be a plurality of repetitions of a PUSCH transmission. In other words, the UE may transmit a plurality of repetitions of a PUSCH transmission associated with a common transport block.

As further shown in FIG. 6, in some aspects, process 600 may include receiving a DFI transmission that includes HARQ feedback associated with the plurality of slot-aggregated PUSCH transmissions, wherein the HARQ feedback is a HARQ ACK or a HARQ NACK (block 620). For example, the UE (e.g., using antenna 252, DEMOD 254, MIMO detector 256, receive processor 258, controller/processor 280, and/or the like) may receive a DFI transmission that includes HARQ feedback associated with the plurality of slot-aggregated PUSCH transmissions, as described above. In some aspects, the HARQ feedback is a HARQ ACK or a HARQ NACK.

As further shown in FIG. 6, in some aspects, process 600 may include determining whether one or more PUSCH transmissions, of the plurality of slot-aggregated PUSCH transmissions, satisfy a delay condition associated with receipt of the DFI transmission (block 630). For example, the UE (e.g., using controller/processor 280 and/or the like) may determine whether one or more PUSCH transmissions, of the plurality of slot-aggregated PUSCH transmissions, satisfy a delay condition associated with receipt of the DFI transmission, as described above.

As further shown in FIG. 6, in some aspects, process 600 may include determining whether the HARQ feedback is valid based at least in part on whether the one or more PUSCH transmissions satisfy the delay condition (block 640). For example, the UE (e.g., using controller/processor 280 and/or the like) may determine whether the HARQ feedback is valid based at least in part on whether the one or more PUSCH transmissions satisfy the delay condition, as described above.

Process 600 may include additional aspects, such as any single aspect or any combination of aspects described below and/or in connection with one or more other processes described elsewhere herein.

In a first aspect, determining whether the one or more PUSCH transmissions satisfy the delay condition includes determining whether a sequentially last PUSCH transmission of the plurality of slot-aggregated PUSCH transmissions satisfies the delay condition.

In a second aspect, alone or in combination with the first aspect, determining whether the one or more PUSCH transmissions satisfy the delay condition includes determining whether any PUSCH transmission of the plurality of slot-aggregated PUSCH transmissions satisfies the delay condition.

In a third aspect, alone or in combination with one or more of the first and second aspects, process 600 includes receiving radio resource control signaling associated with configuring the one or more PUSCH transmissions to which the delay condition applies.

In a fourth aspect, alone or in combination with one or more of the first through third aspects, determining whether the HARQ feedback is valid includes determining whether the HARQ feedback is valid based at least in part on whether the one or more PUSCH transmissions, that satisfy the delay condition, enable a base station to successfully decode the common transport block.

In a fifth aspect, alone or in combination with one or more of the first through fourth aspects, the plurality of slot-aggregated PUSCH transmissions are associated with a configured grant type of PUSCH transmission or a scheduled type of PUSCH transmission.

In a sixth aspect, alone or in combination with one or more of the first through fifth aspects, process 600 includes applying the HARQ NACK based at least in part on a subset of the plurality of slot-aggregated PUSCH transmissions satisfying the delay condition.

In a seventh aspect, alone or in combination with one or more of the first through sixth aspects, process 600 includes selectively retransmitting at least one of the plurality of slot-aggregated PUSCH transmissions based at least in part on whether the HARQ feedback is valid and whether the UE applies the HARQ NACK.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
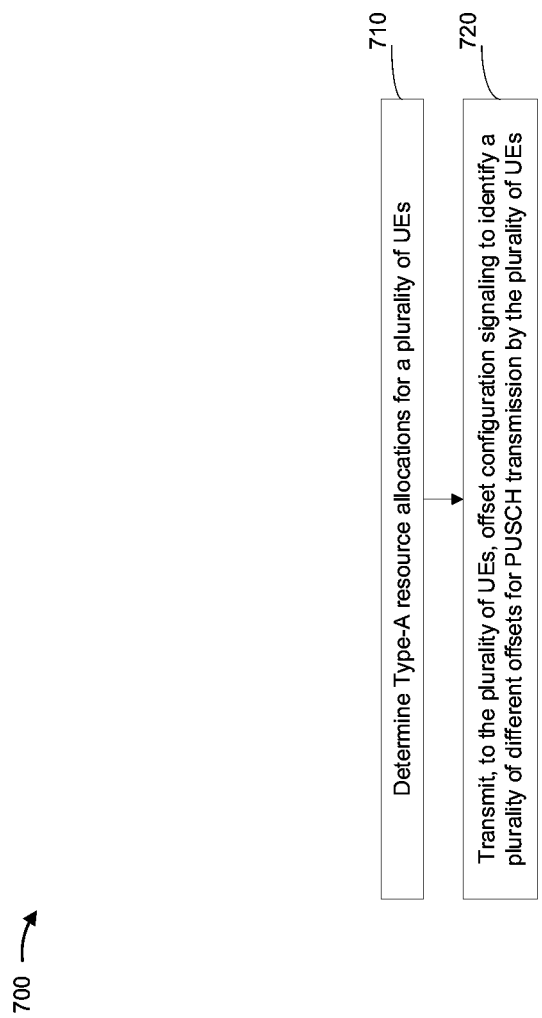
FIG. 7 is a diagram illustrating an example process performed, for example, by a base station, in accordance with various aspects of the present disclosure.

FIG. 7 is a diagram illustrating an example process 700 performed, for example, by a BS, in accordance with various aspects of the present disclosure. Example process 700 is an example where the BS (e.g., BS 110 and/or the like) performs operations associated with offset and dynamic feedback information validation for configured grants.

As shown in FIG. 7, in some aspects, process 700 may include determining Type-A resource allocations for a plurality of UEs (block 710). For example, the BS (e.g., using transmit processor 220, receive processor 238, controller/processor 240, memory 242, and/or the like) may determine Type-A resource allocations for a plurality of UEs, as described above.

As further shown in FIG. 7, in some aspects, process 700 may include transmitting, to the plurality of UEs, offset configuration signaling to identify a plurality of different offsets for physical uplink shared channel (PUSCH) transmission by the plurality of UEs (block 720). For example, the BS (e.g., using transmit processor 220, receive processor 238, controller/processor 240, memory 242, and/or the like) may transmit, to the plurality of UEs, offset configuration signaling to identify a plurality of different offsets for PUSCH transmission by the plurality of UEs, as described above.

Process 700 may include additional aspects, such as any single aspect or any combination of aspects described below and/or in connection with one or more other processes described elsewhere herein.

In a first aspect, transmitting the offset configuration signaling includes transmitting first signaling to a first UE, of the plurality of UEs, to indicate a first offset for PUSCH transmission by the first UE; and transmitting second signaling to a second UE, of the plurality of UEs, to indicate a second offset for PUSCH transmission by the second UE, wherein the first UE and the second UE are configured to perform a listen-before-talk procedure in connection with the first offset and the second offset.

In a second aspect, alone or in combination with the first aspect, process 700 includes transmitting radio resource control signaling to indicate that the plurality of different offsets are applicable to the Type-A resource allocations and not to Type-B resource allocations.

In a third aspect, alone or in combination with one or more of the first and second aspects, transmitting the offset configuration signaling includes transmitting the offset configuration signaling to indicate the Type-A resource allocations, such that the plurality of UEs apply the plurality of different offsets to the Type-A resource allocations and not to Type-B resource allocations.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
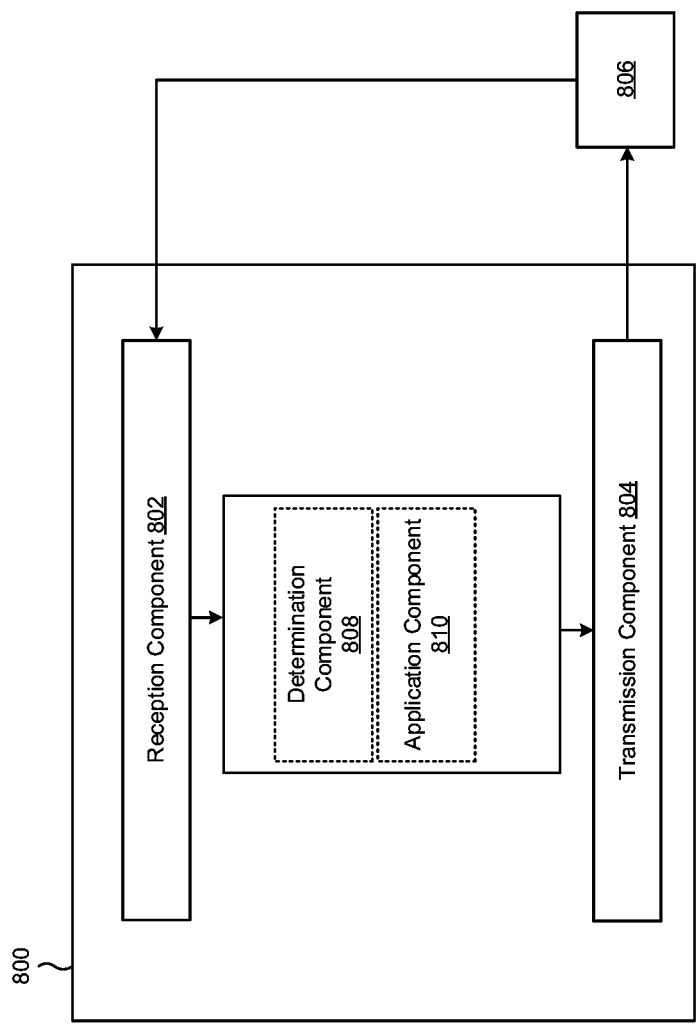
FIGS. 8-9 are diagrams illustrating example apparatuses, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808 or an application component 810, among other examples.

In some aspects, the apparatus 800 may be configured to perform one or more operations described herein in connection with FIGS. 3-5. Additionally or alternatively, the apparatus 800 may be configured to perform one or more processes described herein, such as process 600 of FIG. 6, among other examples. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

The transmission component 804 may transmit a plurality of slot-aggregated physical uplink shared channel (PUSCH) transmissions associated with a common transport block. The reception component 802 may receive a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK). The determination component 808 may determine whether one or more PUSCH transmissions, of the plurality of slot-aggregated PUSCH transmissions, satisfy a delay condition associated with receipt of the DFI transmission. The determination component 808 may determine whether the HARQ feedback is valid based at least in part on whether the one or more PUSCH transmissions satisfy the delay condition. In some aspects, the determination component 808 may include one or more of a receive processor, a transmit processor, a controller/processor, a memory, or a combination thereof, of the UE described above in connection with FIG. 2.

The application component 810 may apply a HARQ NACK based at least in part on a subset of a plurality of slot-aggregated PUSCH transmissions satisfying the delay condition. In some aspects, the application component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
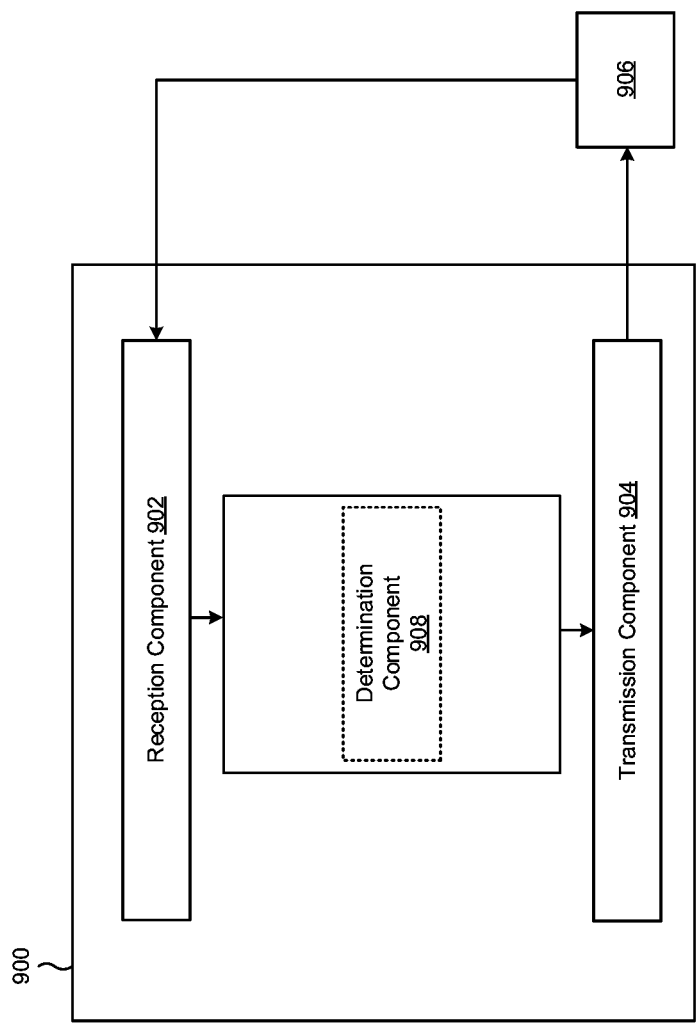

FIG. 9 is a block diagram of an example apparatus 900 for wireless communication. The apparatus 900 may be a BS, or a BS may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 3-5. Additionally or alternatively, the apparatus 900 may be configured to perform one or more processes described herein, such as process 700 of FIG. 7, among other examples. In some aspects, the apparatus 900 and/or one or more components shown in FIG. 9 may include one or more components of the BS described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the BS described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the BS described above in connection with FIG. 2. In some aspects, the transmission component 904 may be collocated with the reception component 902 in a transceiver.

The determination component 908 may determine Type-A resource allocations for a plurality of UEs. In some aspects, the determination component 908 may include a receive processor, a transmit processor, a controller/processor, a memory, or a combination thereof, of the BS described above in connection with FIG. 2. The transmission component 904 may transmit, to the plurality of UEs, offset configuration signaling to identify a plurality of different offsets for PUSCH transmission by the plurality of UEs.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a plurality of slot-aggregated physical uplink shared channel (PUSCH) transmissions associated with a transport block;
    receiving a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK); and
    selectively applying the HARQ feedback based at least in part on whether the HARQ feedback is valid, wherein whether the HARQ feedback is valid is based at least in part on a first symbol of a reception associated with the DFI transmission, a last symbol of a PUSCH transmission of the plurality of slot-aggregated PUSCH transmissions, and a threshold time duration associated with delay, and wherein the delay is associated with the first symbol of the reception and the last symbol of the PUSCH transmission.

2. The method of claim 1, further comprising:
    receiving radio resource control signaling associated with configuring the PUSCH transmission.

3. The method of claim 1, wherein whether the HARQ feedback is valid is further based at least in part on whether the PUSCH transmission enables a base station to successfully decode the transport block.

4. The method of claim 1, wherein the plurality of slot-aggregated PUSCH transmissions are associated with a configured grant type of PUSCH transmission.

5. The method of claim 1, wherein selectively applying the HARQ feedback comprises:
    applying the HARQ NACK based at least in part on whether the HARQ feedback is valid.

6. The method of claim 1, further comprising:
    selectively retransmitting at least one of the plurality of slot-aggregated PUSCH transmissions based at least in part on selectively applying the HARQ feedback.

7. A user equipment (UE) for wireless communication, comprising:
    one or more memories; and
    one or more processors coupled to the one or more memories and configured to:
        transmit a plurality of slot-aggregated physical uplink shared channel (PUSCH) transmissions associated with a transport block;
        receive a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK); and
    selectively apply the HARQ feedback based at least in part on whether the HARQ feedback is valid, wherein whether the HARQ feedback is valid is based at least in part on a first symbol of a reception associated with the DFI transmission, a last symbol of a PUSCH transmission , and a threshold time duration associated with delay, and wherein the delay is associated with the first symbol of the reception and the last symbol of the PUSCH transmission.

8. The UE of claim 7, wherein the one or more processors are further configured to:
    receive radio resource control signaling associated with configuring the PUSCH transmission.

9. The UE of claim 7, wherein whether the HARQ feedback is valid is further based at least in part on whether the PUSCH transmission enables a base station to successfully decode the transport block.

10. The UE of claim 7, wherein the plurality of slot-aggregated PUSCH transmissions are associated with a configured grant type of PUSCH transmission.

11. The UE of claim 7, wherein the one or more processors, selectively apply the HARQ feedback, are configured to:
apply the HARQ NACK based at least in part on whether the HARQ feedback is valid.

12. The UE of claim 7, wherein the one or more processors are further configured to:
selectively retransmit at least one of the plurality of slot-aggregated PUSCH transmissions based at least in part on selectively applying the HARQ feedback.

13. The UE of claim 7, wherein the PUSCH transmission is a last PUSCH transmission of the plurality of slot-aggregated PUSCH transmissions.

14. The UE of claim 7, wherein the plurality of slot-aggregated PUSCH transmissions are associated with a scheduled type of PUSCH transmission.

15. A non-transitory computer-readable medium storing a set of instructions for wireless communication, the set of instructions comprising:
one or more instructions that, when executed by one or more processors of a user equipment (UE), cause the UE to:
transmit a plurality of slot-aggregated physical uplink shared channel (PUSCH) transmissions associated with a transport block;
receive a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK); and
selectively apply the HARQ feedback based at least in part on whether the HARQ feedback is valid, wherein whether the HARQ feedback is valid is based at least in part on a first symbol of a reception associated with the DFI transmission, a last symbol of a PUSCH transmission , and a threshold time duration associated with delay, and wherein the delay is associated with the first symbol of the reception and the last symbol of the PUSCH transmission.

16. The non-transitory computer-readable medium of claim 15, wherein the plurality of slot-aggregated PUSCH transmissions are associated with a configured grant type of PUSCH transmission.

17. An apparatus for wireless communication, comprising:
means for transmitting a plurality of slot-aggregated physical uplink shared channel (PUSCH) transmissions associated with a transport block;
means for receiving a dynamic feedback information (DFI) transmission that includes hybrid automatic repeat request (HARQ) feedback associated with the plurality of slot-aggregated PUSCH transmissions, wherein the HARQ feedback is a HARQ acknowledgement (ACK) or a HARQ negative acknowledgement (NACK); and
means for selectively applying the HARQ feedback based at least in part on whether the HARQ feedback is valid, wherein whether the HARQ feedback is valid is based at least in part on a first symbol of a reception associated with the DFI transmission, a last symbol of a PUSCH transmission of the plurality of slot-aggregated PUSCH transmissions, and a threshold time duration associated with delay, and wherein the delay is associated with the first symbol of the reception and the last symbol of the PUSCH transmission.

18. The apparatus of claim 17, wherein the plurality of slot-aggregated PUSCH transmissions are associated with a configured grant type of PUSCH transmission.

19. The UE of claim 7, wherein the HARQ feedback is the HARQ ACK.

20. The method of claim 1, wherein the HARQ feedback is the HARQ ACK.

21. The method of claim 1, wherein the PUSCH transmission is a last PUSCH transmission of the plurality of slot-aggregated PUSCH transmissions.

22. The method of claim 1, wherein the plurality of slot-aggregated PUSCH transmissions are associated with a scheduled type of PUSCH transmission.

23. The non-transitory computer-readable medium of claim 15, wherein the HARQ feedback is the HARQ ACK.

24. The apparatus of claim 17, wherein the HARQ feedback is the HARQ ACK.

* * * * *